United States Patent
Takagi et al.

(10) Patent No.: US 8,900,769 B2
(45) Date of Patent: Dec. 2, 2014

(54) COUNTER-FREEZE CONTROL METHOD FOR FUEL CELL SYSTEM

(71) Applicant: Honda Motor Co., Ltd, Tokyo (JP)

(72) Inventors: Narihiro Takagi, Saitama (JP); Kuri Kasuya, Saitama (JP)

(73) Assignee: Honda Motor Co., Ltd, Tokyo (JP)

( * ) Notice: Subject to any disclaimer, the term of this patent is extended or adjusted under 35 U.S.C. 154(b) by 0 days.

(21) Appl. No.: 13/677,617

(22) Filed: Nov. 15, 2012

(65) Prior Publication Data
US 2013/0065149 A1    Mar. 14, 2013

Related U.S. Application Data

(62) Division of application No. 12/638,330, filed on Dec. 15, 2009, now abandoned.

(30) Foreign Application Priority Data

Dec. 16, 2008    (JP) .................................. 2008-319419

(51) Int. Cl.
*H01M 8/04*    (2006.01)

(52) U.S. Cl.
CPC ...... *H01M 8/04089* (2013.01); *H01M 8/04201* (2013.01); *H01M 8/04223* (2013.01); *H01M 8/04253* (2013.01); *Y02E 60/50* (2013.01)
USPC ....................................................... 429/443

(58) Field of Classification Search
CPC ...................... H01M 8/04253; H01M 8/04201
USPC ....................................................... 429/443
See application file for complete search history.

(56) References Cited

U.S. PATENT DOCUMENTS

2008/0044691 A1    2/2008   Wake et al.

FOREIGN PATENT DOCUMENTS

| JP | 2002-246054 A | 8/2002 |
|---|---|---|
| JP | 2003-331893 A | 11/2003 |

(Continued)

OTHER PUBLICATIONS

Machine translation of JP 2004-006166, obtained Apr. 21, 2014.*

(Continued)

*Primary Examiner* — Nicholas P D'Aniello
(74) *Attorney, Agent, or Firm* — Westerman, Hattori, Daniels & Adrian, LLP

(57) ABSTRACT

A fuel cell system includes: a fuel cell having an anode and a cathode; an oxidant gas flowpath supplying the oxidant gas to the fuel cell and discharging the oxidant gas from the fuel cell; a first shut-off valve disposed upstream from the fuel cell and having a first valve body; a second shut-off valve disposed downstream from the fuel cell and having a second valve body; a cathode control unit for sealing the cathode; and a scavenging unit for scavenging the anode by supplying the oxidant gas to the anode, wherein the cathode control unit, before scavenging the anode by using the scavenging unit, unseals the cathode by opening the first shut-off valve and the second shut-off valve. The fuel cell system is capable of preventing the valve bodies pressed against seat sections from being frozen even below the freezing temperature, and capable of avoiding a situation unable to restart a turned-off state of the fuel cell system.

4 Claims, 4 Drawing Sheets

(56) References Cited

FOREIGN PATENT DOCUMENTS

| | | |
|---|---|---|
| JP | 2004-006166 A | 1/2004 |
| JP | 2005-141943 A | 6/2005 |
| JP | 2006-221836 A | 8/2006 |
| JP | 2006-302627 A | 11/2006 |
| JP | 2007-193983 A | 8/2007 |
| JP | 2008-218072 A | 9/2008 |

OTHER PUBLICATIONS

Japanese Office Action dated Jan. 8, 2013, issued in corresponding Japanese Patent Application No. 2008-319419 (3 pages).
Japanese Office Action dated May 24, 2011, issued in corresponding Japanese Patent Application No. 2008-319419.
Notification of Reason for Refusal dated Apr. 9, 2012, issued in corresponding Japanese Patent Application No. 2008-319419.

* cited by examiner

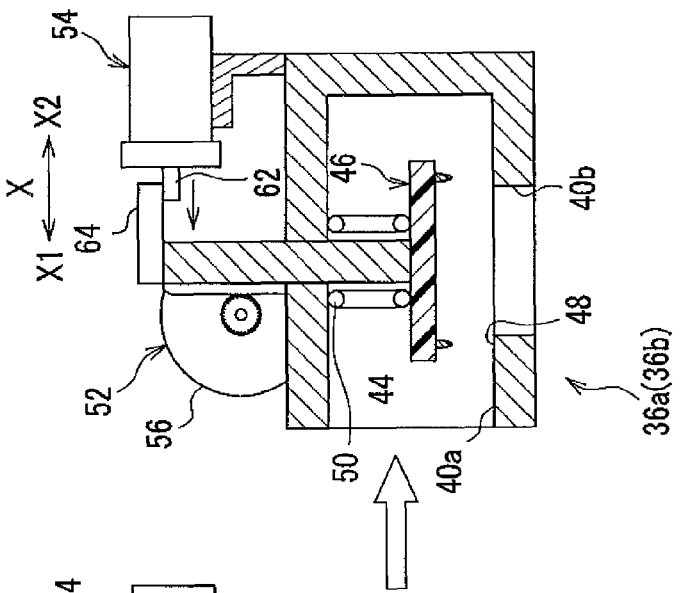
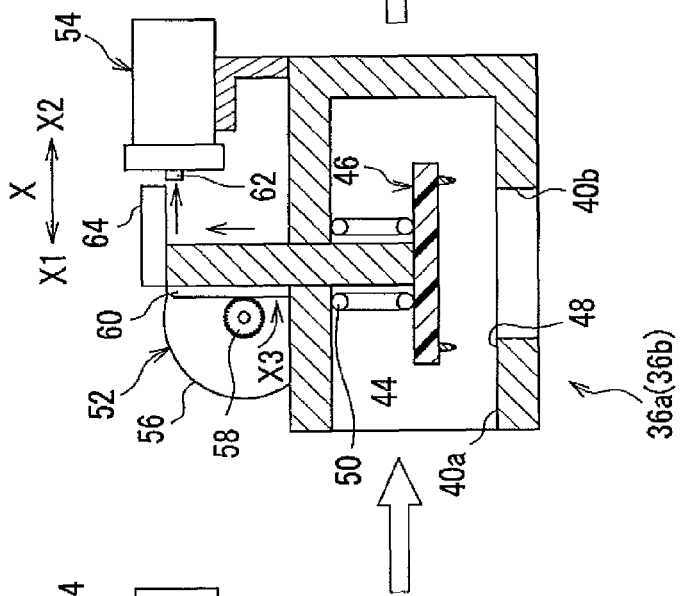
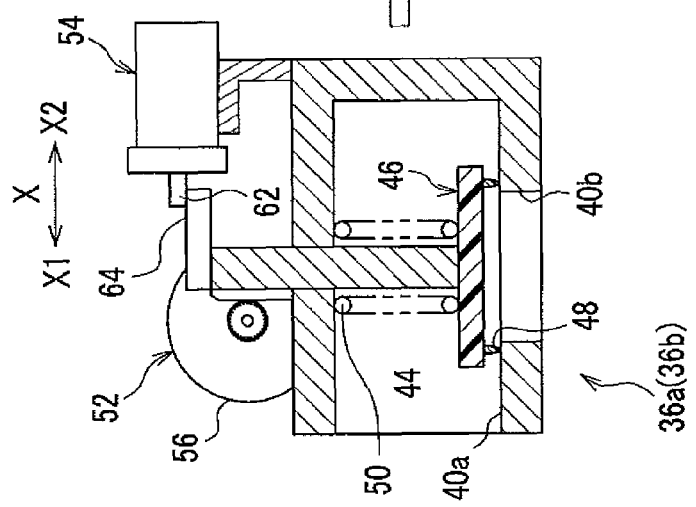

COUNTER-FREEZE CONTROL METHOD FOR FUEL CELL SYSTEM

CROSS REFERENCE TO RELATED APPLICATIONS

This application is a Divisional of U.S. application Ser. No. 12/638,330, filed on Dec. 15, 2009, which claims the foreign priority benefit under Title 35, United States Code, §119 (a)-(d), of Japanese Patent Application No. 2008-319419, filed on Dec. 16, 2008, in the Japan Patent Office, the disclosures of which are herein incorporated by reference in their entirety.

BACKGROUND OF THE INVENTION

1. Field of the Invention

The present invention relates to a fuel cell system capable of unsealing a cathode of a fuel cell before scavenging flowpaths in the fuel cell, in which electro-chemical reaction has been stopped previously by closing a first shut-off valve and a second shut-off valve.

2. Description of the Related Art

Japanese Patent Laid-open Publication No. 2008-218072 (hereinafter called Patent Document 1) discloses an example of fuel cell system having fuel cells including an air-inlet shut-off valve provided at an inlet of a cathode and an air-outlet shut-off valve provided at an outlet of the cathode and preventing gas cross-leak, i.e. a short circuit caused by either gas passing from one side to the other side of the fuel cell through a membrane while no electro-chemical reaction is under way in the fuel cell, by sealing the cathode by means of the air-inlet shut-off valve and the air-outlet shut-off valve after stopping the electro-chemical reaction from progressing in the fuel cell.

The fuel cell system disclosed in Patent Document 1 has a buffer tank for storing air compressed by an air compressor. The pressure of air stored in the buffer tank is higher than a pressure of air supplied to the fuel cell. The fuel cell system disclosed in Patent Document 1 switches the air-inlet shut-off valve and the air-outlet shut-off valve to open and close by using a pressure difference between an atmospheric pressure chamber communicating with ambient air and a pressurized chamber containing the air supplied from the buffer tank.

Japanese Patent Laid-open Publication No. 2006-221836 (hereinafter called Patent Document 2) discloses a fuel cell system including a fuel cell. The fuel cell system disclosed in Patent Document 2 has two normally-closed electromagnetic valves provided respectively at an outlet and an inlet of a cathode, and closes the electromagnetic valves while no electro-chemical reaction is under way in the fuel cell.

The fuel cell systems disclosed in Patent Documents 1 and 2 cannot be restarted sometimes if water remaining on seat sections and on valve bodies pressed against the seat sections freezes in the shut-off valves when ambient temperature lowers below the freezing temperature after stopping electro-chemical reaction in these prior art fuel cells and sealing the cathode by using shut-off valves.

SUMMARY OF THE INVENTION

The present invention was conceived in view of the aforementioned circumstances, and an object thereof is to provide a fuel cell system capable of preventing valve bodies pressed against seat sections from freezing even below the freezing temperature, and capable of avoiding a situation unable to restart a turned-off state of the fuel cell system.

In order to achieve the aforementioned object, the present invention provides a fuel cell system which includes: a fuel cell having an anode to which fuel gas is supplied, and a cathode to which oxidant gas is supplied; a first oxidant gas flowpath through which the oxidant gas is supplied to the fuel cell; a second oxidant gas flowpath through which the oxidant gas is discharged from the fuel cell; a first shut-off valve disposed upstream from the fuel cell and connected to the fuel cell through the first oxidant gas flowpath, the first shut-off valve having a first valve body; a second shut-off valve disposed downstream from the fuel cell and connected to the fuel cell through the second oxidant gas flowpath, the second shut-off valve having a second valve body; a cathode control unit for sealing the cathode by closing the first shut-off valve and the second shut-off valve after electro-chemical reaction is stopped from progressing in the fuel cell; and a scavenging unit for scavenging the anode based on a predetermined condition by supplying the oxidant gas to the anode while stopping the electro-chemical reaction from progressing in the fuel cell, wherein the cathode control unit, before scavenging the anode by using the scavenging unit, unseals the cathode by opening the first shut-off valve and the second shut-off valve.

In order to scavenge the anode by using the scavenging unit, the cathode control unit of the present embodiment is capable of switching the cathode from sealed state to unsealed state by opening the first shut-off valve and the second shut-off valve.

Therefore, even if ambient temperature lowers below the freezing temperature, the cathode control unit according to the present embodiment can switch the first shut-off valve and the second shut-off valve from closed state to open state by lifting off the first valve body of the first shut-off valve and the second valve body of the second shut-off valve from the seat sections easily since residual water and gas can be discharged from the fuel cell by using the scavenging unit. Accordingly, the fuel cell system according to the present invention can avoid a situation unable to restart the fuel cell system once after turning off the ignition switch since no water exists on seat sections of the first shut-off valve and the second shut-off valve. In addition, the fuel cell system may use a fewer number of parts to achieve a simple, small-size, and light-weight structure since the fuel cell system according to the present embodiment can eliminate an anti-freezing mechanism for preventing the seat sections in the first shut-off valve and the second shut-off valve from freezing.

The fuel cell system of the present invention may further include a valve lock unit for locking the first valve body of the first shut-off valve and the second valve body of the second shut-off valve in open state after unsealing the cathode. By doing this, the present invention is capable of maintaining the first shut-off valve and the second shut-off valve in open state stably and reliably.

Even when an ambient temperature lowers below the freezing temperature, the fuel cell system of the present invention is capable of moving the shut-off valves smoothly since no water exists on the valve bodies and on the seat sections.

BRIEF DESCRIPTION OF THE DRAWINGS

FIGS. 5A to 5C show movements of the first shut-off valve and the second shut-off valve. FIG. 5A is a longitudinal cross-sectional view showing the shut-off valve in closed state. FIG. 5B is a longitudinal cross-sectional view showing the shut-off valve in open state. FIG. 5C is a longitudinal cross-sectional view showing the shut-off valve locked in open state.

DETAILED DESCRIPTION OF THE INVENTION

The structure of a fuel cell system according to an embodiment of the present invention will be explained in detail with reference to the accompanying drawings.

The present invention is not limited to fuel cells used in vehicles and can be applied to any other fuel cells used for transportation means including ocean vessels and aircrafts, and for stationary fuel cell systems.

Figure 1:
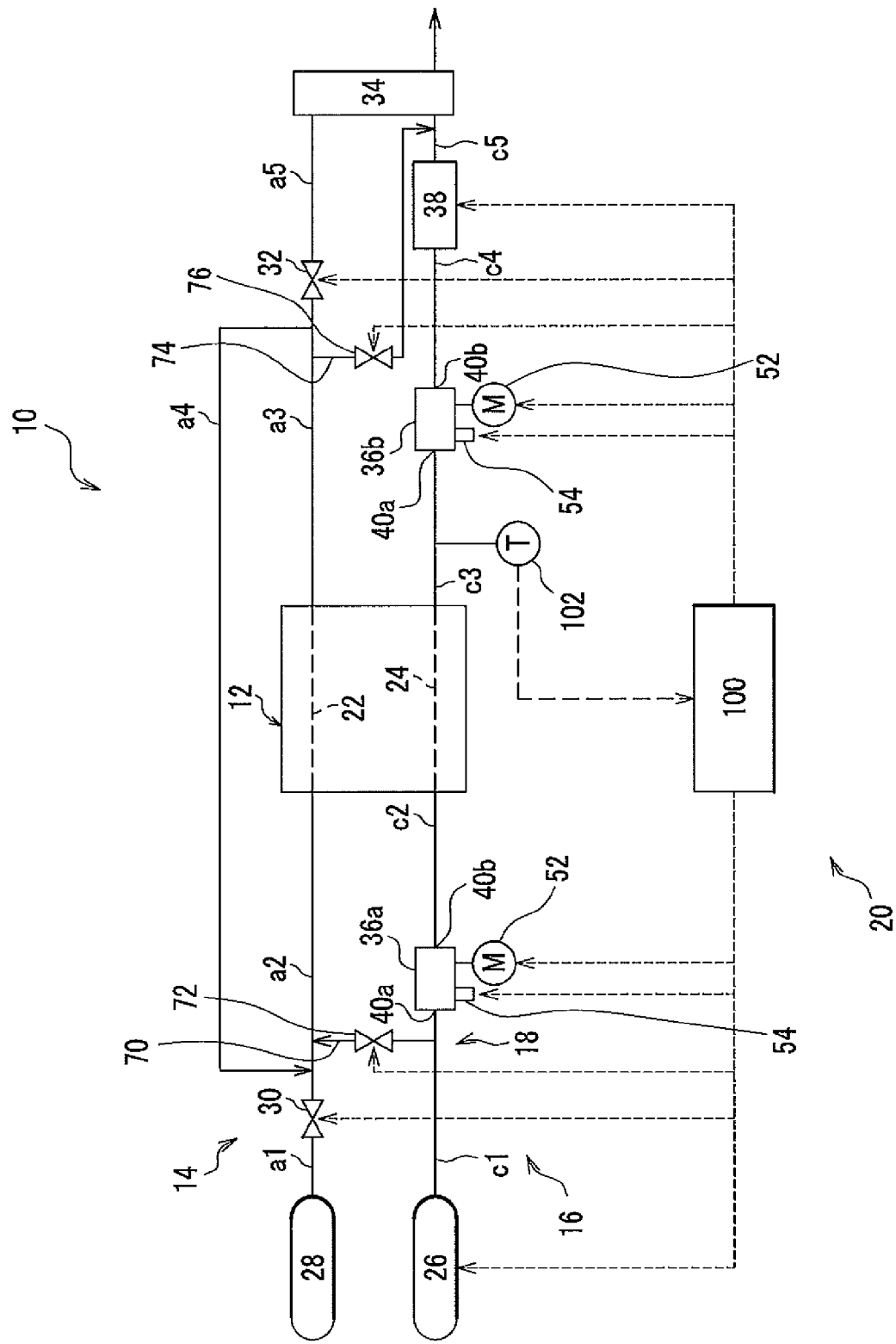
FIG. 1 is a schematic diagram of a fuel cell system according to an embodiment of the present invention.

As shown in FIG. 1, a fuel cell system 10 according to the present embodiment includes a fuel cell 12; an anode system 14; a cathode system 16; an anode-scavenging system 18; and a control system 20.

The fuel cell 12 is a polymer electrolyte fuel cell (PEFC) which includes a plurality of stacked single cells each having a membrane electrode assembly (MEA) disposed between two separators (not shown in the drawings).

The MEA includes a cathode; an anode; and an electrolyte membrane (e.g. polymer membrane) disposed between the anode and the cathode. Each of the cathode and the anode have an electrode catalyst layer having a catalyst such as platinum supported on a catalyst support made of carbon black etc. Each separator has an anode flowpath 22 and a cathode flowpath 24, both of which are grooves or through holes.

The fuel cell 12 starts to generate electricity when electrochemical reaction occurs on the catalysts included in the anode and the cathode with hydrogen supplied to the anode and air supplied to the cathode.

The fuel cell 12 generates electricity with an external load (not shown in the drawings) connected to the fuel cell 12 and creates electric current from electrons produced in the electro-chemical reaction. The external load may be a motor for driving a fuel cell vehicle, a capacitor serving as condenser or battery, or an air pump 26 which will be explained later.

The anode system 14 includes a hydrogen tank 28; a shut-off valve 30; a purge valve 32; and pipes a1 to a5 etc.

The hydrogen tank 28 stores highly pressurized and very pure hydrogen, and is connected to the shut-off valve 30 disposed downstream from the hydrogen tank 28 through the pipe a1. The shut-off valve 30, which may be an electromagnetic valve, is connected to the inlet of the anode flowpath 22 of the fuel cell 12 disposed downstream from the shut-off valve 30 through the pipe a2.

The purge valve 32, which may be an electromagnetic valve, is connected to the outlet of the anode flowpath 22 of the fuel cell 12 disposed upstream from the purge valve 32 through the pipe a3. Non-reacted hydrogen is discharged from the outlet of the anode of the fuel cell 12 and returns to the inlet of the anode through the pipe a4. The pipe a4 is connected with the pipe a2 connected to the inlet of the anode flowpath 22. The pipe a4 is also connected with the pipe a3 connected to the outlet of the anode flowpath 22.

An ejector, which is not shown in the drawing, is provided at a junction point of the pipe a4 and the pipe a2. The ejector uses a negative pressure, created by a flow of the hydrogen supplied from the hydrogen tank 28, to suck gas (hydrogen in this embodiment) returning through the pipe a4. The purge valve 32 is connected with a diluting apparatus 34 through the pipe a5 disposed downstream from the purge valve 32.

The cathode system 16 includes the air pump 26; a first shut-off valve 36a; a second shut-off valve 36b; a back-pressure-regulating valve 38; the diluting apparatus 34; and pipes c1 to c5 (oxidant gas flowpaths) etc.

The air pump 26 may be a mechanical supercharger driven by a motor not shown in the drawings. Air introduced from outside into the air pump 26 is compressed therein and supplied to the fuel cell 12.

The first shut-off valve 36a is connected to the air pump 26 through the pipe c1, and is connected to an inlet of the cathode flowpath 24 through the pipe c2. The second shut-off valve 36b is connected to the outlet of the cathode flowpath 24 of the fuel cell 12 through pipe c3, and is connected to the back-pressure-regulating valve 38 through the pipe c4.

Hereinafter, the structure of the first shut-off valve 36a will be explained. The explanation of the structure of the second shut-off valve 36b will be omitted since the first shut-off valve 36a and the second shut-off valve 36b (which may be hereinafter simply called "shut-off valves" or "each shut-off valve") are normally-closed valves having an identical structure.

Figure 2:
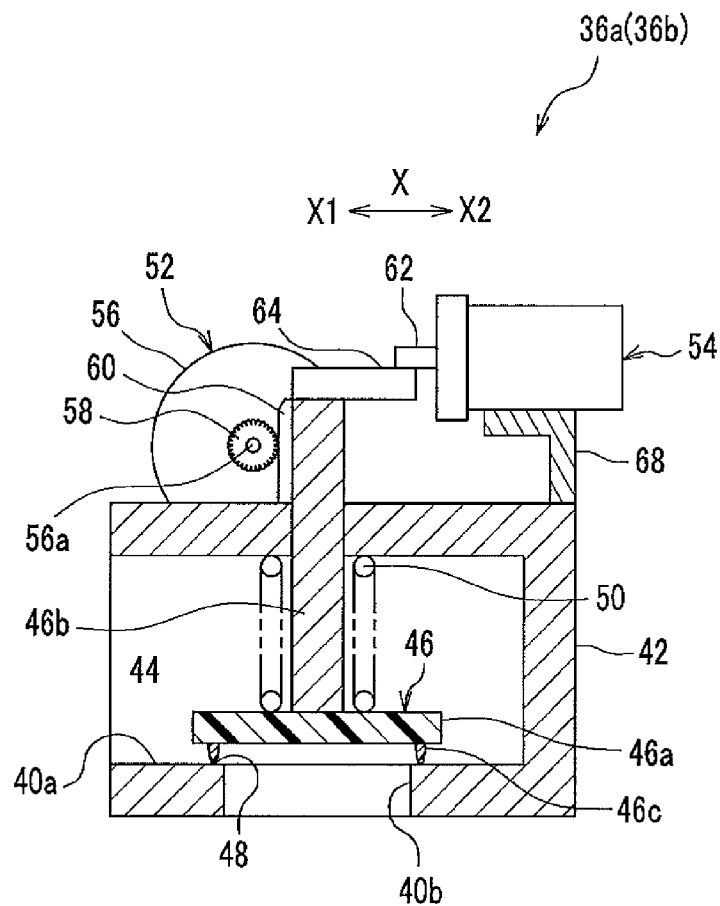
FIG. 2 is a longitudinal cross-sectional view showing a first and a second shut-off valves included in the fuel cell system.

As shown in FIG. 2, the first shut-off valve 36a includes: a valve housing 42; a chamber 44; a valve body 46; a seat section 48; a spring 50; a valve-driving section 52; and a locking section 54. The valve housing 42 has an inlet port 40a into which gas (i.e. air in the present embodiment) is supplied; and an outlet port 40b from which the supplied gas is discharged. The chamber 44 is formed in the valve housing 42. The valve body 46 turns on and shuts off communication between the inlet port 40a and the outlet port 40b. The seat section 48 is formed in the valve housing 42. The spring 50 presses the valve body 46 toward the seat section 48. The valve-driving section 52 moves the valve body 46 in two directions i.e. from and toward the seat section 48. The locking section 54 maintains the valve body 46 open.

As shown in FIG. 1, the pipe c1 is disposed between the air pump 26 and the inlet port 40a of the valve housing 42 of the first shut-off valve 36a. The pipe c2 is disposed between the outlet port 40b of the valve housing 42 of the first shut-off valve 36a and the inlet of the cathode flowpath 24 of the fuel cell 12. The pipe c3 is disposed between the outlet of the cathode flowpath 24 of the fuel cell 12 and the inlet port 40a of the valve housing 42 of the second shut-off valve 36b. The pipe c4 is disposed between the outlet port 40b of the second shut-off valve 36b and an inlet of the back-pressure-regulating valve 38. In the present embodiment, the first shut-off valve 36a and the second shut-off valve 36b have the reverse arrangement of the inlet port 40a and the outlet port 40b (see FIG. 4).

The valve body 46 has a circular-plate disc section 46a; and a rod section 46b attached to the center of the disc section 46a. A valve packing 46c is attached on the bottom surface of the disc section 46a and is pressed against the seat section 48 of the valve housing 42 to seal the cathode.

The valve-driving section 52 may include, for example, a rotational driving source 56, a pinion 58, and a rack section 60. The rotational driving source 56 has an electric drive unit such as a stepper motor etc. and a rotational driving shaft 56a provided therein. The pinion 58 is attached on the rotational driving shaft 56a. The rack section 60 in mesh with the pinion 58 is formed on an outer periphery of the rod section 46b and is exposed from the valve housing 42. The rotational driving source 56 is fixed on the valve housing 42 via a fixture (not shown in the drawing).

In this structure, the rotational driving force produced by the rotational driving source 56 is transmitted to the pinion 58 through the rotational driving shaft 56a and is converted into a linear (vertical) movement of the valve body 46 through the rack section 60 being in mesh with the pinion 58. Accordingly, when the valve body 46 presses against the seat section 48 and closes the outlet port 40b, communication is shut off between the inlet port 40a and the outlet port 40b; and when the valve body 46 is lifted off from the seat section 48, the communication is obtained from the inlet port 40a to the outlet port 40b through the chamber 44 of the valve housing 42.

The locking section 54 includes: a solenoid (not shown in the drawings) made of a wire coil wound in the locking section 54; a fixed core; a movable core, not shown in the drawings, retracted toward the fixed core by means of excitation effect obtained by supplying electricity to the solenoid; a lock pin 62 joined to the movable core and capable of protruding and retracting in the horizontal directions X1 and X2 together with the movable core. An engagement block 64 is joined to an end (e.g. a free end) of the rod section 46b of the valve body 46. The engagement block 64 moves together with the valve body 46 and is locked in open state by the lock pin 62. The valve housing 42 has a support 68 attached thereon for supporting the locking section 54 having the lock pin 62. The solenoid, the movable core, and the fixed core are not shown in the drawings.

When an electronic control unit (ECU) 100 stops electricity from being supplied to the solenoid, the lock pin 62 protrudes by a predetermined length in the direction X1. The protruded lock pin 62 is capable of locking the engagement block 64. When the ECU 100 starts supplying electricity to the solenoid, the lock pin 62 retracts in the direction X2 by means of excitation effect of the solenoid. The lock pin 62 in this state is disposed apart from the engagement block 64.

The fuel cell system 10 according to the present invention is not limited to use the lock pin 62 which engages with the engagement block 64 joined to the valve body 46 in the elevated position to maintain the open state of the shut-off valves 36a and 36b. Alternatively, the present invention may omit the lock pin 62 and may protrude the movable core, not shown in the drawings, to lock the engagement block 64 directly.

In the present invention, the fuel cell system 10 has a high-voltage battery and a low-voltage battery, which are not shown in the drawings. The ECU 100 drives the rotational driving source 56 of the valve-driving section 52 and the solenoid of the locking section 54 by using the low-voltage battery. In addition, the present invention does not limit the first shut-off valve 36a and the second shut-off valve 36b to the aforementioned normally-closed shut-off valves. For example, the present invention may use normally-open shut-off valves, which are opened during electro-chemical reaction progressing in the fuel cell 12 and are closed by the aforementioned valve-driving section 52 while maintaining the cathode in sealed state after stopping electro-chemical reaction from progressing in the fuel cell 12. In addition, a fixture (or a locking mechanism) not shown in the drawings may support the shut-off valves in closed state.

The back-pressure-regulating valve 38 for controlling the pressure of oxidant gas in the cathode of the fuel cell 12 may be, for example, a normally-open butterfly valve whose opening is variable. The back-pressure-regulating valve 38 is connected with the diluting apparatus 34 through the pipe c5.

The un-reacted hydrogen discharged from through the purge valve 32 is mixed with cathode off-gas discharged from the cathode in the diluting apparatus 34, and then discharged out of the fuel cell vehicle. The cathode system 16 has a humidifier, not shown in the drawings, in the pipe c1 for humidifying air supplied by the air pump 26.

The anode-scavenging system 18 includes: an air introduction pipe 70; an air-introduction valve 72; an air-discharging pipe 74; and an air-discharging valve 76 etc. In the present embodiment, the air introduction pipe 70, the air-introduction valve 72, the air-discharging pipe 74, and the air-discharging valve 76 constitute a scavenging unit.

The air introduction pipe 70 has an upstream end and a downstream end. Air (also called scavenging gas or oxidant gas) supplied by the air pump 26 is introduced into the anode through the air introduction pipe 70. The upstream end of the air introduction pipe 70 is connected with the pipe c1, and the downstream end of the air introduction pipe 70 is connected with the pipe a2. The air introduction pipe 70 has the air-introduction valve 72. ECU 100 opens the air-introduction valve 72 prior to scavenging the anode after stopping the electro-chemical reaction from progressing in the fuel cell 12.

The air discharged (i.e. gas purged) from the anode passes through the air-discharging pipe 74 and returns to the cathode system 16. The upstream end of the air-discharging pipe 74 is connected with the pipe a3, and the downstream end of the air-discharging pipe 74 is connected with the pipe c5. The air-discharging pipe 74 has the air-discharging valve 76. ECU 100 opens the air-discharging valve 76 prior to scavenging the anode.

Figure 3:
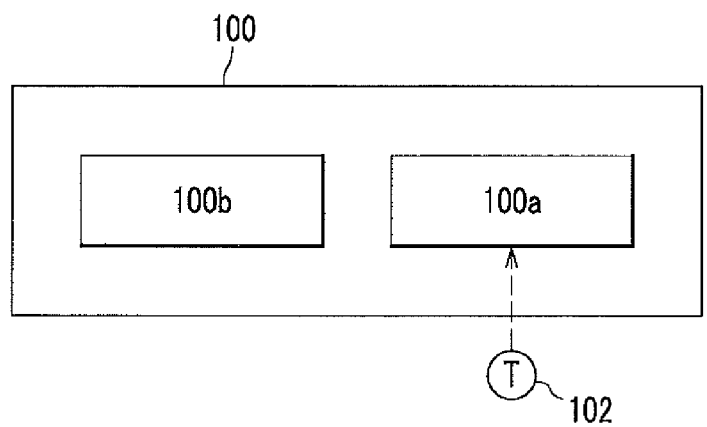
FIG. 3 is a block diagram of an electronic control unit used in the fuel cell system.

FIG. 3 is a block diagram of the electronic control unit 100 used in the fuel cell system 10.

The control system 20 includes: the ECU 100; and a thermo sensor 102 for measuring the temperature in the fuel cell 12. The ECU 100 includes a central processing unit (CPU); a read-only memory (ROM) storing a program for controlling a scavenging process; and a random access memory (RAM) etc.

As shown in FIG. 3, the ECU 100 has a fuel cell temperature measurement section 100a for measuring the temperature in the fuel cell 12 and a counter-freeze control section 100b. The ECU 100 sends out an instruction signal to the thermo sensor 102 to send back a signal indicative of a measured temperature at a predetermined interval. The thermo sensor 102 sends out the signal indicative of the measured temperature, to the fuel cell temperature measurement section 100a. The counter-freeze control section 100b determines whether the ECU 100 scavenges inside the fuel cell 12 based on the measured temperature in the fuel cell 12 measured by the thermo sensor 102. Hereinafter, this process is called a counter-freeze-scavenging process.

The ECU 100 opens and closes the shut-off valve 30, the purge valve 32, the first shut-off valve 36a, the second shut-off valve 36b, the air-introduction valve 72, and the air-discharging valve 76. The ECU 100 also controls the valve-driving section 52 and the locking section 54 of each shut-off valve. The ECU 100 regulates the pressure of air passing through the cathode system 16 by controlling the rotation speed of the motor provided in the air pump 26 and the opening degree of the back-pressure-regulating valve 38.

Hereinafter, operation of the fuel cell system 10 according to the present embodiment having the aforementioned basic structure will be explained with reference to the accompanying drawings, particularly to the flowchart of FIG. 4.

Firstly, when the fuel cell system 10 starts operation after the driver turns on an ignition switch of the fuel cell vehicle, the ECU 100 opens both the first shut-off valve 36a and the second shut-off valve 36b to unseal the cathode, and opens the shut-off valve 30 to supply hydrogen from the hydrogen tank 28 to the anode. The ECU 100 drives the air pump 26 to supply air to the cathode, and then the electro-chemical reaction starts in the fuel cell 12.

While the fuel cell system 10 is in operation, the ECU 100 keeps both the air-introduction valve 72 and the air-discharging valve 76 closed, and the ECU 100 opens the purge valve 32 at a predetermined interval to discharge impurities, such as nitrogen or water permeating from the cathode through the electrolyte membrane to the anode and remaining in an anode circulation system including the pipes a2 to a4 and the anode flowpath 22.

Figure 4:
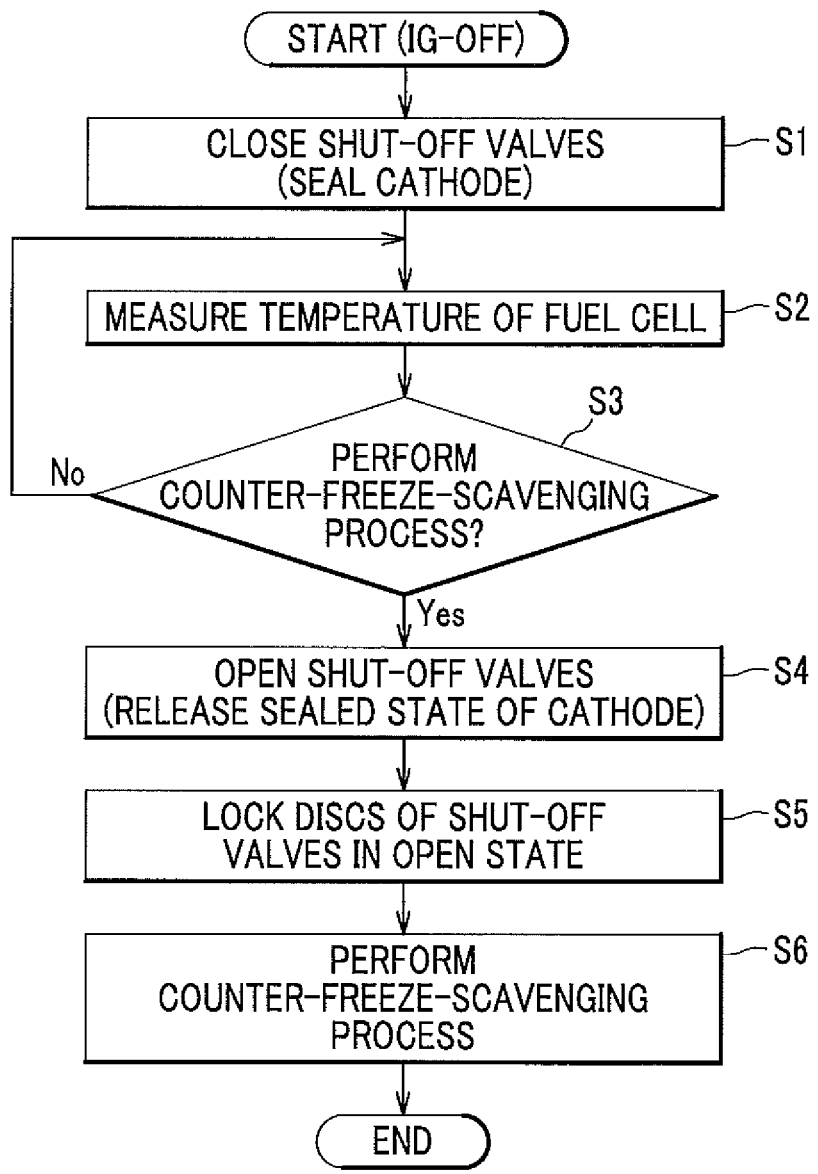
FIG. 4 is a flowchart of a scavenging process conducted in the fuel cell system.

Secondly, operation of the fuel cell system 10 according to the present invention will be explained as follows after turning off an ignition switch of the fuel cell vehicle and stopping electro-chemical reaction (see a flowchart starting from "IG-OFF" as shown in FIG. 4) from progressing in the fuel cell 12.

When the ECU 100 recognizes that the driver turns off the ignition switch ("IG-OFF" in the flowchart), the ECU 100 supplies air to the cathode, for example, for a predetermined duration while driving the air pump 26. The diluting apparatus 34 dilutes hydrogen remaining in the diluting apparatus 34 by using the cathode off-gas discharged from the cathode. The gas containing the diluted hydrogen and water produced in the cathode is discharged out of the fuel cell vehicle. The ECU 100 closes the shut-off valve 30 to stop supplying hydrogen to the anode and stops supplying air to the cathode to stop electro-chemical reaction from progressing in the fuel cell 12. The ECU 100 further disconnects the external load from the fuel cell 12 electrically.

As shown in FIG. 4, the ECU 100 in step S1 sends out a control signal to each of the first shut-off valve 36a and the second shut-off valve 36b to close the valve bodies of the first shut-off valve 36a and the second shut-off valve 36b to seal the cathode of the fuel cell 12.

As shown in FIG. 5A, the first shut-off valve 36a and the second shut-off valve 36b of the present embodiment are normally-closed shut-off valves each having the spring 50 pressing the valve body 46 onto the seat section 48 by means of spring force to keep the valve body 46 seated on the valve body 46. While the cathode is kept sealed, the communication is shut off between the inlet port 40a and the outlet port 40b in each shut-off valve, and no electricity is supplied from the batteries included in the fuel cell system 10 to the rotational driving source 56 of the valve-driving section 52. In addition, the solenoid of the locking section 54 is unexcited.

Therefore, the fuel cell system 12 of the present invention is capable of preventing fresh air from coming into the cathode flowpath 24 while no electricity is being generated in the fuel cell 12, and is capable of preventing gas cross-leak which may reduce power output efficiency of the fuel cell 12, since the ECU 100 controls the normally-closed shut-off valves 36a and 36b to seal the cathode of the fuel cell 12.

In step S2, the fuel cell temperature measurement section 100a detects the temperature in the fuel cell 12 measured by the thermo sensor 102. The fuel cell temperature measurement section 100a sets an interval for the thermo sensor 102 to measure the temperature of the fuel cell 12. After the fuel cell temperature measurement section 100a measures the temperature in the fuel cell 12, the flowchart proceeds to step S3.

In the step S3, the ECU 100 determines whether the counter-freeze control section 100b conducts a counter-freeze-scavenging process in the fuel cell 12. In the present invention, the counter-freeze-scavenging process is defined as a process of blowing and discharging residual water from the anode and the cathode etc. by supplying air (scavenging gas) to the anode and the cathode if the ECU 100 determines that the water existing in the fuel cell 12 will freeze when the temperature in the fuel cell 12 lowers below the freezing temperature.

More specifically, if the temperature in the fuel cell 12 measured by the thermo sensor 102 in the step S3 is higher than the freezing temperature (0° C.) ("No" in the flowchart of FIG. 4), the fuel cell operation returns to the step S2 since the residual water remains unfrozen; and if the temperature in the fuel cell 12 lowers below the freezing temperature ("Yes" in the flowchart of FIG. 4), the fuel cell operation proceeds to step S4 since the residual water remaining in the fuel cell 12 will freeze.

In the step S4, the ECU 100 sends out a control signal to the first shut-off valve 36a and the second shut-off valve 36b to switch the valve bodies 46 of the first shut-off valve 36a and the second shut-off valve 36b from the closed state to open state to unseal the cathode.

More specifically, at first, when the ECU 100 supplies electricity to the solenoid of the locking section 54 of each shut-off valve, the lock pin 62 moves together with the movable core (not shown in the drawings) in the retracting direction X2 by means of the excitation effect of the solenoids as shown in FIG. 5B. After that, when the ECU 100 supplies electricity to the rotational driving source 56 of the valve-driving section 52 to rotate the rotational driving shaft 56a. As the pinion 58 coupled with the rotational driving shaft 56a is rotated counter clockwise (as indicated by an arrow X3 in the drawing), the rack section 60 in mesh with the pinion 58 exceeds the downward spring force of the spring 50, and then valve body 46 is elevated through engagement between the pinion 58 and the rack section 60.

Accordingly, the valve body 46 in each shut-off valve is lifted off from the seat section 48 by a predetermined distance through the rotational movement of the rotational driving source 56 being converted to a linear movement of the rack section 60 in mesh with the pinion 58. As a result, communication is obtained from the inlet port 40a to the outlet port 40b through the chamber 44.

After both the shut-off valves 36a and 36b open, the ECU 100 stops electricity from being supplied to the solenoid of the locking section 54 of each shut-off valve and the solenoid becomes unexcited. A return spring, not shown in the drawings, presses the lock pin 62 together with the movable core in direction X1 as shown in FIG. 5C. The lock pin 62 locks the engagement block 64 to maintain each shut-off valve open.

After the shut-off valves 36a and 36b are locked and become open, the ECU 100 sends a control signal to the aforementioned low-voltage battery to stop supplying electricity to the rotational driving source 56.

In step S6, the ECU 100 conducts the counter-freeze-scavenging process in the fuel cell 12. More specifically, firstly, the ECU 100 sends out a control signal to the air-introduction valve 72 and the air-discharging valve 76 to open the valve bodies of the air-introduction valve 72 and the air-discharging valve. Then, the ECU 100 drives the air pump 26 and supplies air (scavenging gas) to the anode flowpath 22 of the fuel cell 12 to blow off residual water remaining in the anode flowpath 22. The gas replaced by the scavenging gas and blown off from the anode flowpath 22 contains anode off-gas. The water and gas discharged from the anode flowpath 22 and the cathode flowpath 24 are introduced into the diluting apparatus 34, and then discharged out of the fuel cell vehicle.

The fuel cell system 10 of the present invention can discharge produced water together with residual gas remaining in the fuel cell 12 by performing the aforementioned counter-freeze-scavenging process. The fuel cell system 10 of the present invention is capable of preventing gas cross-leak even if the valve bodies 46 of the first shut-off valve 36a and the second shut-off valve 36b are locked in open state since no chemical reaction occurs between the anode and the cathode after performing the counter-freeze-scavenging process. Since anode gas (hydrogen) remaining in the anode flowpath 22 is replaced sufficiently with scavenging gas (air or oxidant gas), both the anode and the cathode of the fuel cell 12 fill with air (or oxidant gas). In this state, the fuel cell 12 will suffer no degradation since no electro-chemical reaction occurs locally in the fuel cell 12. Therefore, the ECU 100 after performing the counter-freeze-scavenging process does not have to seal the cathode by using the first shut-off valve 36a and the second shut-off valve 36b.

Hereinafter, an operation of releasing the locked state of the first and second shut-off valves 36a and 36b will be explained.

In order to unlock both the shut-off valves 36a and 36b, electricity is supplied to the solenoid of each locking section 54. Then, the lock pin 62 moves together with the movable core in the direction X2 with the excitation effect of the solenoid. The engagement block 64 is released from the lock pin 62, and then the spring 50 presses the valve body 46 onto the seat section 48 with its spring force. Accordingly, the first shut-off valve 36a and the second shut-off valve 36b in locked state are switched from open state to closed state.

According to the present embodiment, the ECU 100 prior to performing the counter-freeze-scavenging process is capable of switching the cathode from sealed state to unsealed state by opening the first shut-off valve 36a and the second shut-off valve 36b.

Since water and gas are discharged from the fuel cell in a counter-freeze-scavenging process, no water exists on the seat sections 48 of the first shut-off valve 36a and the second shut-off valve 36b after the counter-freeze-scavenging process. Therefore, even when the ambient temperature lowers below the freezing temperature, the ECU 100 according to the present embodiment can open the first shut-off valve 36a and the second shut-off valve 36b, which are being closed, by lifting off the valve bodies 46 of the shut-off valves 36a and 36b from the seat sections 48. Accordingly, the fuel cell system 10 according to the present embodiment can avoid a situation unable to restart a turned-off state of the fuel cell system 10. In addition, the fuel cell system 10 may use a fewer number of parts to achieve a small-size and light-weight valve control unit having a simple structure since the fuel cell system 10 according to the present embodiment can eliminate an anti-freezing mechanism for preventing the seat sections 48 in the first shut-off valve 36a and the second shut-off valve 36b from freezing.

As explained above, the fuel cell system 10 of the present invention is capable of moving the shut-off valves 36a and 36b smoothly since the valve bodies 46 will not freeze while being pressed against the seat sections 48 even when an ambient temperature lowers below the freezing temperature.

The fuel cell system 10 according to the present embodiment is capable of maintaining the first shut-off valve 36a and the second shut-off valve 36b in open state stably and reliably while avoiding reduced efficiency in terms of electricity output, since the valve-driving section 52 does not consume electricity while maintaining the valve body 46 in open state.

The present invention is capable of preventing damage to the fuel cell system 10 or system down of the fuel cell system 10 due to abnormal pressure since the locking section 54 locks and maintains the valve body 46 in open state. More specifically, the locking section 54 never switches the valve body 46 from open state to closed state even if the valve-driving section 52 for driving the valve body 46 has a defect (e.g. power drop if the valve-driving section 52 is driven electrically as explained according to the present embodiment, or abnormal air pressure if the valve-driving section 52 is a pneumatic unit not shown in the drawings). In addition, the fuel cell system 10 can save electricity by stopping electricity from being supplied to the rotational driving source 56 while the valve body 46 is maintained open, since the valve-driving section 52 needs no force for maintaining the valve body 46 in open state. In addition, if the fuel cell system 10 uses pneumatic valve-driving mechanisms 52, the present invention can reduce the number of parts used in the shut-off valves 36a and 36b because a pneumatic valve-driving section 52 can eliminate a pressure-control mechanism.

What is claimed is:

1. A counter-freeze control method for a fuel cell system, the fuel cell system comprising:
   a fuel cell having an anode to which fuel gas is supplied, and a cathode to which oxidant gas is supplied;
   a first shut-off valve connected to and disposed upstream from the fuel cell, the first shut-off valve having a first valve body;
   a second shut-off valve connected to and disposed downstream from the fuel cell, the second shut-off valve having a second valve body;
   a cathode control unit for sealing and unsealing the cathode by using the first shut-off valve and the second shut-off valve,
   the method comprising the steps of:
   stopping an electro-chemical reaction, which has been previously under way, from progressing in the fuel cell;
   closing the first shut-off valve and the second shut-off valve to seal the cathode;
   measuring temperature in the fuel cell;
   determining whether the cathode control unit performs a counter-freeze-scavenging process based on the measured temperature, residual water remaining in the anode and the cathode being discharged by supplying oxidant gas to both the anode and the cathode in the counter-freeze-scavenging process;
   unsealing the cathode by opening the first shut-off valve and the second shut-off valve;
   maintaining the first valve body and the second valve body open; and
   performing the counter-freeze-scavenging process, wherein
   the first shut-off valve and the second shut-off valve remain in the same state during the counter-freeze-scavenging process and after the counter-freeze-scavenging process.

2. The method as claimed in claim 1, wherein
   the fuel cell system further comprises a valve lock unit which locks the first valve body and the second valve body in open state after the cathode is unsealed, and wherein
   the valve lock system is used in the step of maintaining the first valve body and the second valve body in open state.

3. The method as claimed in claim 1, wherein
   the fuel cell system further comprises an air introduction pipe and an air-discharging pipe,
   wherein the oxidant gas is introduced into the anode through the air introduction pipe,
   wherein a gas purged from the anode passes through the air-discharging pipe,
   wherein the first shut-off valve is provided closer to the fuel cell than an upstream end of the air introduction pipe, and wherein the second shut-off valve provided closer to the fuel cell than a downstream end of the air-discharging pipe.

4. The method as claimed in claim 1, wherein the first shut-off valve and the second shut-off valve are not closed after the counter-freeze-scavenging process.

\* \* \* \* \*